July 18, 1944.                    G. T. REICH                    2,353,784
              METHOD AND APPARATUS FOR PROCESSING FOOD PRODUCTS
                             Filed Nov. 30, 1939
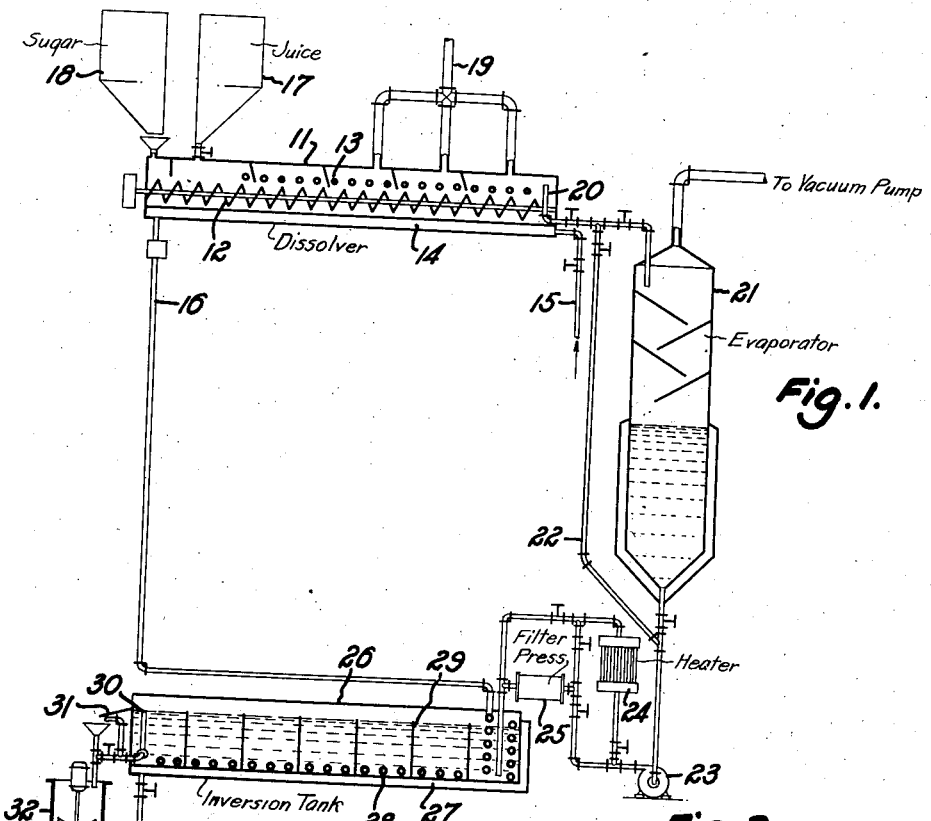
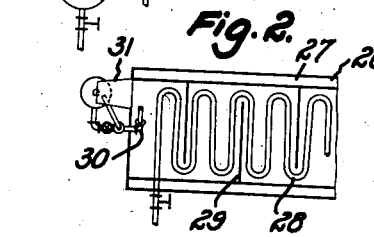
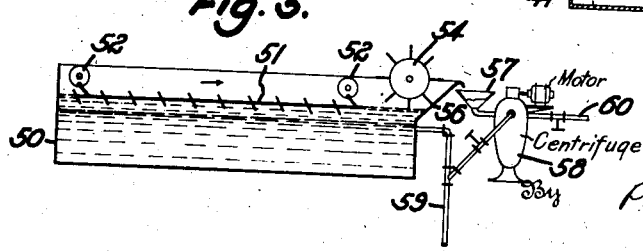
Inventor:
Gustave T. Reich
By Potter, Pierce & Scheffler
Attorneys.

Patented July 18, 1944

2,353,784

UNITED STATES PATENT OFFICE 2,353,784

METHOD AND APPARATUS FOR PROCESSING FOOD PRODUCTS

Gustave T. Reich, Philadelphia, Pa.

Application November 30, 1939, Serial No. 306,981

11 Claims. (Cl. 99—132)

The invention relates to a method and apparatus for the production of food products. It is especially useful in the production of jellies and the like and will be particularly described with reference to the production of jellies.

In certain processes for the production of foodstuffs, it is desirable that the materials be subjected to a cooking operation which for the best results requires careful and accurate control as to time and temperature in order that the optimum treatment may be effected. Typical of such processes is the making of jellies. In my copending application Serial No. 151,760, filed July 2, 1937, I have described a new process for the manufacture of jellies in which a major portion of the desired inversion of the sugar content of material is brought about by heating the material at a temperature below the boiling point. While a number of factors affect the rate of inversion, for example, the hydrogen ion concentration of the mixture, for a given mixture the degree of inversion is dependent upon the time and temperature of heating. To obtain a predetermined degree of inversion the time of heating must be increased as the temperature is decreased if other conditions remain the same.

However, it has been found that in this, as well as in other food processing operations, the best results are not obtained by subjecting a given bulk of the material to the optimum time and temperature, unless provision is made to insure that not merely the average degree of treatment of the whole bulk, but the actual degree of treatment of each portion thereof, is the optimum treatment. In other words, a food product in which a portion has been overtreated and another portion proportionately undertreated is not the equivalent of a product in which each portion has been subjected to the optimum treatment, particularly because in dealing with food products properties such as flavor, color, clarity, texture and the like are involved in a complicated manner in any processing operation.

The invention therefore provides a method and apparatus for processing foodstuffs which comprises subjecting each portion of the foodstuff under treatment to optimum conditions of treatment. This is particularly useful in the development of continuous treating processes, which are highly desirable from the point of view of economy, but, which if not carried out in a proper manner, result in a product which is uniform only in the sense that the various portions have been mixed and blended and not at all in the sense that each portion has been subjected to a uniform optimum treatment.

As applied, for example, to the production of jellies and the like from fruits, the method of the invention comprises inverting a predetermined portion of the sugar content of an aqueous mixture of fruit juices and sugar by flowing the mixture in bulk without substantial agitation through a heating zone at a temperature below the boiling point and above the jelling point of the mixture so that the rate of passage of every portion of the mixture through the heating zone is substantially equal to the overall rate of passage of the mixture through the zone.

In order to maintain a uniform constant treatment of each portion of the material regardless of variation in the rate of feed of material to the treating zone, the invention also comprises varying the total volume of material in the treating zone in proportion to the variations in rate of feed so that the passage of material through the treating zone is maintained at a constant predetermined rate.

The invention will be more particularly described, as applied to the production of jellies, with reference to the accompanying drawing in which:

Fig. 1 is a semi-diagrammatic representation of a system of apparatus embodying the invention;

Fig. 2 is a partial plan view of the discharge end of the invention vessel of the apparatus of Fig. 1;

Fig. 3 is a plan view, and Fig. 4 is a sectional elevation of another form of inversion tank; and Fig. 5 is a sectional elevation of a further form of inversion tank.

In Fig. 1, 11 is a dissolver provided with a screw conveyor-agitator 12, heating coils 13 and heating jacket 14. The heating coils and jacket are supplied with steam by supply line 15 and the exhaust or condensed steam is removed through 16.

Fruit juice obtained in any suitable way and the proper proportion of sugar are continuously added from containers 17 and 18, respectively, to dissolver 11. Acid and pectin may also be added, if desired. Under the influence of heat and agitation, the sugar is dissolved in the fruit juice and the materials are thoroughly blended. A certain amount of evaporation may be effected in the dissolver if desired and in some cases all the necessary evaporation is carried out in this apparatus, the evaporated water being removed through outlet 19. At least a portion of the heating in the dissolver is preferably effected by means of heating coils 13 positioned near the top of the liquor in the vessel where the mixture is most dilute so that evaporation is more efficient and danger of caramelizing the solid sugar in the bottom of the tank is eliminated. The mixture from dissolver 11 is removed through outlet 20 which is preferably adjustable as to height so that the volume of mixture in the dissolver may be maintained at a suitable proportion to the rate of feed. The mixture may be passed either to evaporator 21 or directly through pipe 22 to pump 23 by which it is pumped through heater 24 or filter press 25 or both to inversion tank 26.

This inversion tank is designed to subject the solution continuously and uniformly to a predetermined temperature below the boiling point of the solution for a time depending on the temperature and the hydrogen ion concentration of the solution which will bring about a predetermined degree of inversion of the sugar content of the solution. The inversion tank 26, as shown in Figs. 1 and 2, comprises a rectangular vessel provided with a jacket 27 and heating coils 28. Although the tank is shown as rectangular in shape, it may be circular or any other convenient shape. The vessel is divided into a series of communicating compartments by alternating lateral baffles 29. The volume of material in the vessel and, therefore, the time of travel of the material through the vessel, are determined by the height of adjustable outlet pipe 30 which may be varied in accordance with variations in the rate of speed to maintain the time of travel constant. The temperature of the solution is maintained at a predetermined point by jacket 27 and coil 28, either or both of which are advantageously supplied with exhaust or condensed steam from dissolver 11 since the inversion operation is carried out at a temperature below the boiling point of the solution. The solution flowing from the inversion tank through outlet 30 is fed after skimming at 31 if desired into mixer 32 from which it is packed in the final containers.

A modification of the inversion tank is shown in Figs. 3 and 4. In this form the tank 40 is provided with a number of perpendicular baffles 41 projecting in alternation from opposite ends of the tank and forming a plurality of compartments through which the material undergoing inversion of its sugar content flows in succession from inlet 42 to outlet 43. In the form shown in these figures, each compartment is provided with an agitator 44 in the upper portion thereof. These agitators continuously break up the scum and reincorporate it in the material without substantially agitating the bulk of the material. In order to maintain the agitators only in the upper portion of the material at varying rates of flow and corresponding volumes of material in the tank, it is desirable to provide means for adjusting the horizontal position of the agitators.

In the inversion vessel shown in Fig. 5, the tank 50 is provided with a scraper assembly 51, eccentrically mounted at 52, 52' so that the scraper members 53 move and lift the scum in the direction of the arrow. Rotating wheel 54 with scraper members 55 carries the scum up apron 56 into funnel 57. Funnel 57 may be connected to the feed end of a centrifugal separator 58 in which the liquid portion is separated and returned to the liquid outlet line 59 and the separated scum is discharged through line 60.

In a typical operation utilizing the method and apparatus of the invention for the manufacture of cranberry jelly, a mixture of cranberry juice and sugar at a concentration to yield from 40 to 45 per cent of total sugar in the finished jelly is continuously passed through an inversion zone at a temperature of 180° F. without substantial agitation at such a rate that each portion of the mixture passes through the zone in approximately six minutes. Under these conditions, about 80% of the sugar is inverted and a product of highly desirable flavor, color, clarity and texture is obtained.

The particular conditions described are merely illustrative and a wide variation of conditions may be utilized without departing from the principles of the invention which comprises passing a fluid mixture of a foodstuff in a continuous stream through a heating zone at a predetermined temperature without substantial agitation so that the rate of passage of every portion of the mixture through the heating zone is substantially equal to the overall rate of passage of the mixture through the zone, and as particularly applied to the manufacture of jellies and the like comprises passing a jelly-forming mixture through an inversion zone wherein each portion of the material is subjected to a temperature above its jelling point and below its boiling point for a constant and uniform length of time effective to bring about a predetermined degree of inversion.

I claim:

1. A method of processing foodstuffs which comprises passing a fluid mixture of the foodstuff in a continuous stream through a heating zone at a predetermined temperature without substantial agitation so that the rate of passage of every portion of the mixture through the heating zone is substantially equal to the overall rate of passage of the mixture through the zone, and adjusting the total volume of the mixture in the heating zone with respect to the rate of flow of the mixture into the heating zone to maintain each portion of the mixture in the heating zone for a predetermined constant period of time.

2. In the manufacture of jellies, the step which comprises inverting a predetermined portion of the sugar content of a mixture comprising fruit juice and sugar by passing the mixture in a continuous stream through a heating zone maintained at a temperature below the boiling point of the mixture without substantial agitation so that the rate of passage of every portion of the mixture through the heating zone is substantially equal to the overall rate of passage of the mixture through the zone.

3. In the manufacture of jellies, the step which comprises inverting a predetermined portion of the sugar content of a mixture comprising fruit juice and sugar by passing the mixture in a continuous stream through a heating zone maintained at a temperature below the boiling point of the mixture without substantial agitation so that the rate of passage of every portion of the mixture through the heating zone is substantially equal to the overall rate of passage of the mixture through the zone, and adjusting the total volume of the mixture in the heating zone with respect to the rate of flow of the mixture into the heating zone to maintain each portion of the mixture in the heating zone for a predetermined constant period of time.

4. In the manufacture of jellies, the step which comprises inverting a predetermined portion of the sugar content of a mixture comprising fruit juice and sugar by passing the mixture in a continuous stream through a heating zone maintained at a temperature below the boiling point of the mixture without substantial agitation so that the rate of passage of every portion of the mixture through the heating zone is substantially equal to the overall rate of passage of the mixture through the zone, and removing scum from the upper portion of said mixture during its passage through the heating zone.

5. In the manufacture of jellies, the step which comprises inverting a predetermined portion of the sugar content of a mixture comprising fruit juice and sugar by passing the mixture in a continuous stream through a heating zone maintained at a temperature below the boiling point of the mixture without substantial agitation so that the rate of passage of every portion of the mixture through the heating zone is substantially equal to the overall rate of passage of the mixture through the zone, removing scum from the upper portion of said mixture during its passage through the heating zone, subjecting the scum to centrifugal force to separate a liquid portion therefrom, and returning the separated liquid portion to the heating zone.

6. In the manufacture of jellies, the step which comprises inverting a predetermined portion of the sugar content of a mixture comprising fruit juice and sugar by maintaining a substantially unagitated body of the liquid in continuous flow through a heating zone maintained at a temperature below the boiling point of the mixture.

7. In the manufacture of jellies, the step which comprises inverting a predetermined portion of the sugar content of a mixture comprising fruit juice and sugar by maintaining a substantially unagitated body of the liquid in continuous flow through a heating zone maintained at a temperature below the boiling point of the mixture, and adjusting the level of the body of the mixture in the heating zone with respect to the rate of flow of the mixture into the heating zone to maintain each portion of the mixture in the heating zone for a predetermined constant period of time.

8. Apparatus for the processing of foodstuffs in fluid form comprising a container providing an elongated channel, means for heating the contents of said channel, means for supplying a foodstuff to be processed at one end of said channel, and means for removing processed foodstuff from the other end of said channel, said removing means being adjustable to vary the level of the body of foodstuff in said channel.

9. Apparatus for the processing of foodstuffs in fluid form comprising a container providing an elongated channel, means for heating the contents of said channel, means for supplying a foodstuff to be processed at one end of said channel, means for removing processed foodstuff from the other end of said channel, and means for agitating only the upper portion of the body of foodstuff in said channel.

10. Apparatus for the processing of foodstuffs in fluid form comprising a container providing an elongated channel, means for heating the contents of said channel, means for supplying a foodstuff to be processed at one end of said channel, means for removing processed foodstuff from the other end of said channel, and means for skimming material from the upper surface of the body of foodstuff in said channel.

11. Apparatus for the processing of foodstuffs in fluid form comprising a container providing an elongated channel, means for heating the contents of said channel, means for supplying a foodstuff to be processed at one end of the channel, means for removing processed foodstuff from the other end of the channel, and means for varying the level of foodstuff in the channel to adjust the total volume of the foodstuff in the channel with respect to the rate of flow of the foodstuff into the channel to maintain each portion of the foodstuff in the channel for a predetermined constant period of time.

GUSTAVE T. REICH.